United States Patent
Iyer et al.

(10) Patent No.: US 8,504,733 B1
(45) Date of Patent: Aug. 6, 2013

(54) SUBTREE FOR AN AGGREGATION SYSTEM

(75) Inventors: Subramoniam N. Iyer, Newark, CA (US); Praveen Yalagandula, Redwood City, CA (US); Vanish Talwar, Palo Alto, CA (US); Steve Ko, Savoy, IL (US); Dejan S. Milojicic, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1232 days.

(21) Appl. No.: 11/831,782

(22) Filed: Jul. 31, 2007

(51) Int. Cl.
*G06F 15/16* (2006.01)

(52) U.S. Cl.
USPC ........... 709/252; 707/713; 707/769; 707/705; 709/223; 709/224; 709/220

(58) Field of Classification Search
USPC .................. 709/223, 224, 252, 220; 707/705, 707/713, 769
See application file for complete search history.

(56) References Cited

U.S. PATENT DOCUMENTS

| | | | |
|---|---|---|---|
| 5,659,725 A * | 8/1997 | Levy et al. | 1/1 |
| 6,424,967 B1 * | 7/2002 | Johnson et al. | 1/1 |
| 7,346,601 B2 * | 3/2008 | Chaudhuri et al. | 1/1 |
| 2007/0198479 A1 * | 8/2007 | Cai et al. | 707/3 |
| 2007/0239759 A1 * | 10/2007 | Shen et al. | 707/102 |
| 2008/0082628 A1 * | 4/2008 | Rowstron et al. | 709/217 |
| 2008/0086469 A1 * | 4/2008 | Gu et al. | 707/6 |

OTHER PUBLICATIONS

Yalagandula, P. "A Scalable Distributed Information Management System", SIGCOMM'04, Aug. 30-Sep. 3, 2004, Portland Oregan, ACM 2004.

* cited by examiner

*Primary Examiner* — Harunur Rashid

(57) ABSTRACT

A subtree within a global tree of nodes is created by determining a predicate condition. The predicate condition is disseminated to the nodes in the global tree. For each node in the global tree, a determination of whether the node belongs to the subtree is performed, and an indication of whether the node belongs to the subtree is stored. After the subtree is created, a query corresponding to the subtree is put to the subtree for resolution.

20 Claims, 12 Drawing Sheets

SUBTREE FOR AN AGGREGATION SYSTEM

BACKGROUND

Information Technology personnel (IT personnel) responsible for managing data centers constantly have to perform a number of management tasks such as capacity planning, resource allocation, license management, and patch management. Most of these tasks require careful examination of the current status of all the machines or a subset of the machines in the data center. Considering these tasks, especially for large data centers, it is important to have a scalable monitoring solution that provides insights into system-wide performance information instantly, for example, by capturing data center level metrics. Data center level metrics include metrics computed for multiple machines in a data center. For example, a data center level metric may be an aggregation or average of individual-machine metrics (node level metrics). Examples of data center level metrics include, number of licensed copies of software running in the data center, number of servers for each type of server deployed in the data center, locations of computer resources, cooling and temperature information, power information, etc. Data center level metrics may also include traditional performance metrics for hardware and software, such as CPU utilization, memory and hard disk utilization, web server response times, etc, for multiple machines. These data center level metrics may be used by a system administrator for managing the resources in a data center.

Current approaches to collecting data center level metrics are primarily focused on using centralized databases where such information is collected and aggregated. For example, FIG. 12 shows a conventional system where metrics are received and stored at a central database 1200. Computers 1210 may be in a single data center or multiple data centers. Each of the computers sends captured node level metrics to the central database 1200 for storage. And data center level metrics are computed at the central database. A system administrator 1220 access the central database 1200 to view the collected data center level metrics.

The centralized database solution shown in FIG. 12 does not scale well for large or multiple data centers. For example, consolidated data centers might have 14,000 physical servers, 2,600 applications and 8,400 application instances. Using a typical performance agent, such as Hewlett Packard's™ OpenView Performance Agent (HP OVR), to collect 68 metrics regarding systems and applications every five minutes, would result in 952,000 data points being reported every five minutes and stored in the central database 100. Sending all this data to a single location may not be feasible depending on bandwidth limitations and time constraints. It may take several hours to gather and produce reports on the captured metrics. However, in today's adaptive enterprise systems, such information may be required in much shorter time periods.

Secondly, complexity is an issue considering the variety of tools that gather different types of data. For example, HP OVR collects performance data, the Domain Controller collects data related to Microsoft™ Windows™, and HP Asset collects asset data. Thus, a user needs to interface with multiple tools to collect different types of data, which makes gathering data center level metrics an even more difficult task. Many automated, centralized systems do not have the capability to automatically interface with multiple types of tools to capture and store the different types of data captured by each tool.

SUMMARY

A subtree within a global tree of nodes is created by determining a predicate condition. The predicate condition is disseminated to the nodes in the global tree. For each node in the global tree, a determination of whether the node belongs to the subtree is performed, and an indication of whether the node belongs to the subtree is stored. After the subtree is created, a query corresponding to the subtree is forwarded only along the subtree for resolution.

BRIEF DESCRIPTION OF DRAWINGS

The invention will be described in detail in the following description of preferred embodiments with reference to the following figures.

DETAILED DESCRIPTION

For simplicity and illustrative purposes, the principles of the embodiments are described by referring mainly to examples thereof. Also, in the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the description of the embodiments.

According to an embodiment, an in-network aggregation system is operable to collect and store metrics for nodes in the network. The system is a peer-to-peer (P2P) system comprised of P2P nodes storing the metrics. The nodes are organized as global trees and subtrees within the global trees for storing metrics. The nodes organized as global trees and subtrees are also operable to respond to queries about the metrics quickly and efficiently. The system is in-network because nodes capturing metrics may also store the metrics and are included in the aggregation system that is operable to respond to queries about the metrics.

The P2P, in-network, aggregation system is scalable as it performs in-network aggregation of metrics with large number of nodes and metrics. This design leverages the computing and network resources of the data center itself to compute the data center level metrics and avoids maintaining a separate infrastructure with expensive software and hardware for collecting, analyzing, and reporting data center level metrics. Second, the system is able to collect different types of data from different data collection tools. The system incorporates distributed agents at the nodes capable of interacting with different collection tools and aggregating the collected data through the trees. For example, each of the nodes in the system runs an agent for collecting and storing different types of information, including data center level metrics such as hardware configuration information, software license information, performance metrics, etc. The agent running on each node not only acts as a data collector and data storer for collecting and storing metrics on the node, it also acts as a node in a large distributed aggregation tree.

Figure 1:
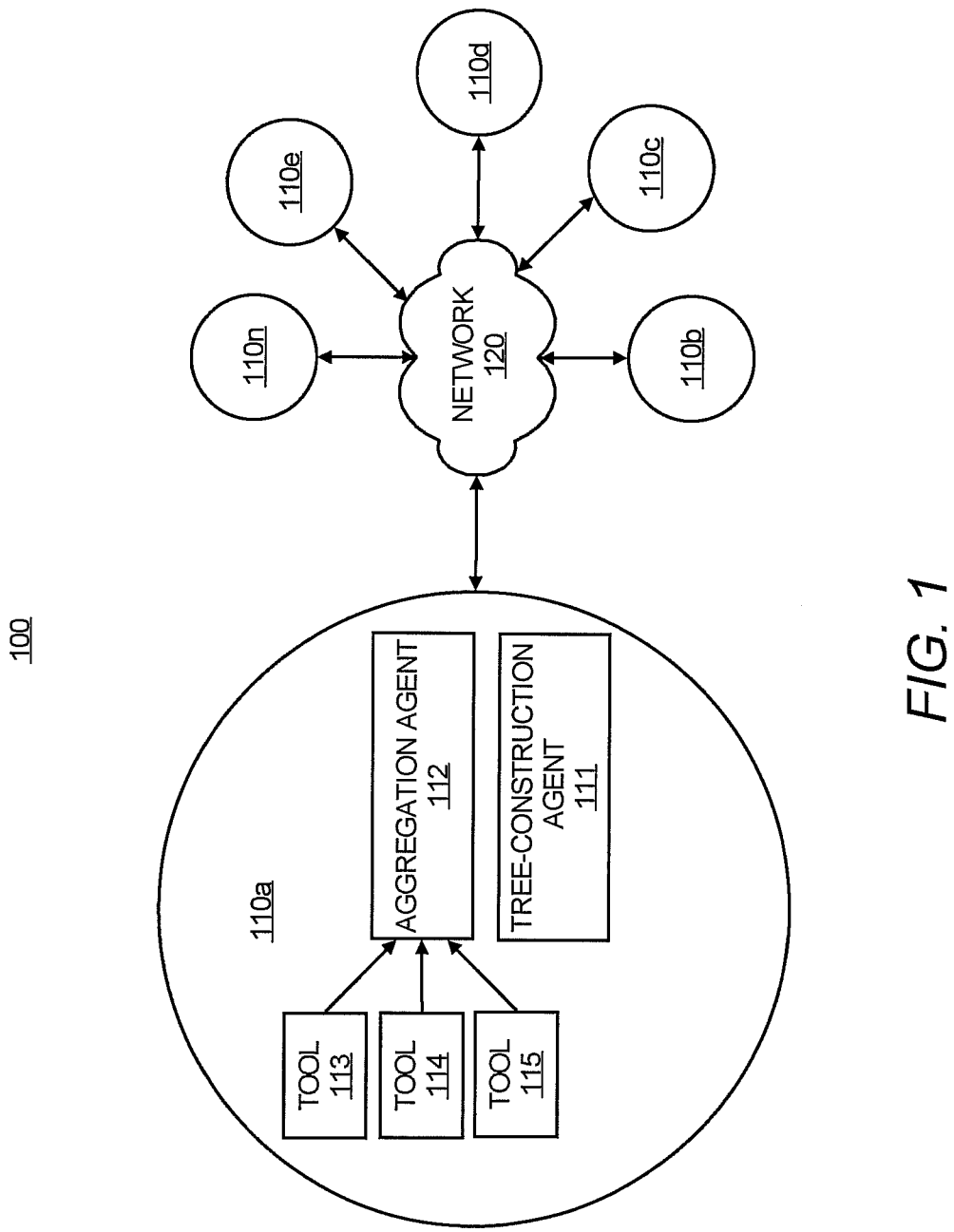
FIG. 1 illustrates an in-network aggregation system, according to an embodiment.

FIG. 1 illustrates a P2P in-network aggregation system 100, according to an embodiment. The system 100 includes nodes 110a-n connected via a network 120. A node is any device that may send and/or receive messages from another device via the network 120. One example of a node is a computer system, such as a server, but the node may be other types of devices. The nodes 110a-n are P2P nodes that also participate in a distributed hash table (DHT) system. The node 110a is shown as including a tree-construction agent 111 for performing functions for creating trees and subtrees. The node 110a also includes an aggregation agent 112 for collecting and aggregating data and responding to queries. The aggregation agent 112 may be connected to multiple different data collection tools, such as tools 113-115, for capturing different types of data. Some examples of the different types of data include performance metrics, asset information, license information, and hardware and software configurations. The agents 111 and 112 may include software. Also, some or all of the components of the node 110a, such as the tools 113-115 and agents 111-112, may be provided in all the nodes 110a-n providing a data aggregation service and other services.

In one embodiment, the nodes 110a-n are DHT overlay nodes forming a DHT overlay network. A DHT overlay network is a logical representation of an underlying physical network, which provide, among other types of functionality, data placement, information retrieval, and overlay routing. DHT overlay networks have several desirable properties, such as scalability, fault-tolerance, and low management cost. Some examples of DHT overlay networks that may be used in the embodiments of the invention include content-addressable-network (CAN), PASTRY, CHORD, etc.

It will be apparent to one of ordinary skill in the art that the system 100 may include many more nodes than shown. Also, the nodes 110a-n may be housed in a single data center or may be housed in multiple data centers. However, nodes need not be in a data center to be included in the system 100. Furthermore, the global tree construction described herein is described with respect to DHT nodes in a DHT overlay network. It will be apparent to one of ordinary skill in the art that other mechanisms may be used for global tree construction.

According to an embodiment, the system 100 uses the Scalable Distributed Information Management System (SDIMS) described in "A Scalable Distributed Information Management System" by P. Yalagandula et al., and published in ACM SIGCOMM 2004 Conference, in August 2004. SDIMS is distributed P2P middleware that forms several aggregation trees, also referred to herein as global trees, and aggregates different metrics on the trees, so the system scales with both the number of nodes in the system and the number of metrics. SDIMS uses a DHT overlay network to construct and maintain the global trees, which handles reconfigurations such as node failures, node additions, and network failures.

In SDIMS, a global tree may aggregate a single attribute for multiple nodes to determine data center level metrics. An attribute may be a node level metric. Examples of attributes include CPU utilization, or a characteristic of a node, such as a type of server or operating system (OS) hosted on a server, etc. The attribute values, for example, are percentage of CPU utilization, C-class blade server or LINUX OS. Attribute values for a node may be stored at the node and aggregated by the global tree.

In SDIMS, a global tree is created by hashing an attribute to determine a key. Once the key is determined a put or a get operation may be performed in the DHT as is known in the art for DHT networks to retrieve data from and send data to a DHT node associated with the key. In SDIMS a global tree includes the paths from nodes in the system to the root node associated with the key. This is illustrated in FIG. 2.

Figure 2:
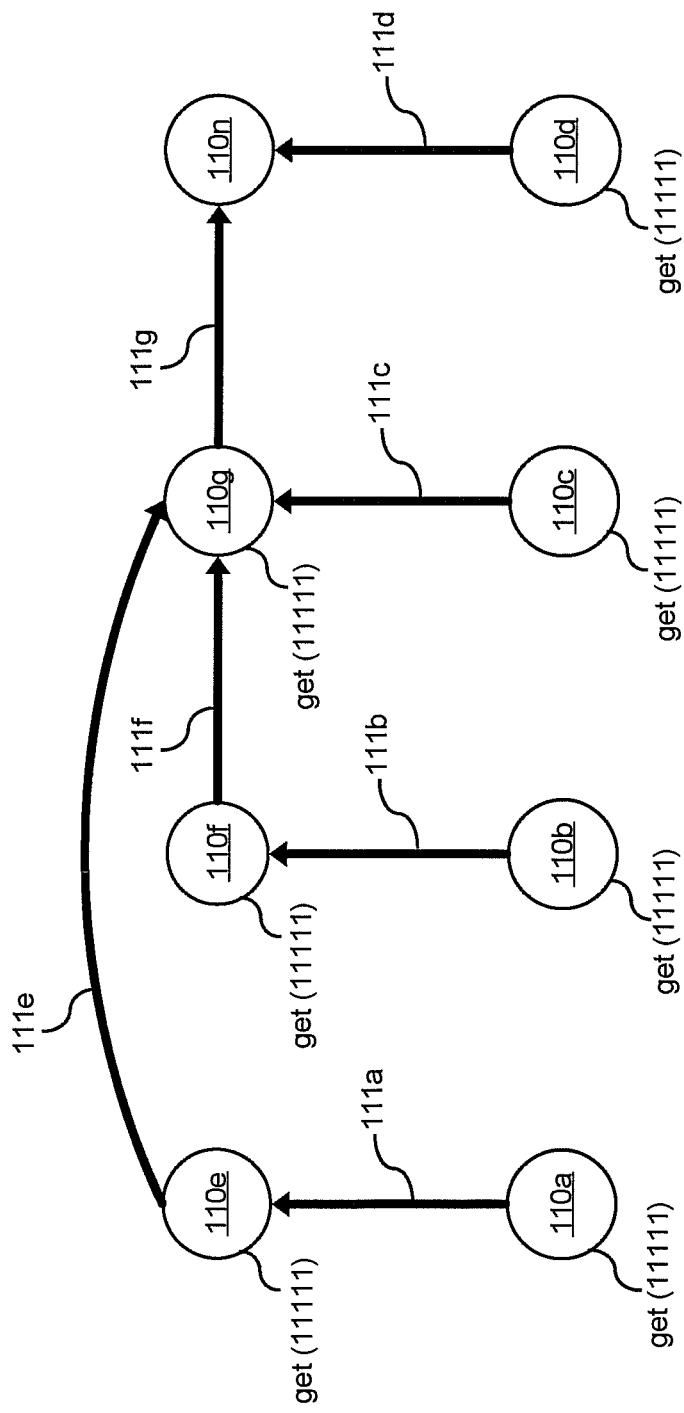
FIG. 2 illustrates creating a global tree, according to an embodiment.

FIG. 2 shows a key 11111. In this example, the key 11111 corresponds to the root node 110n. The value 1111 is a hash of an attribute, such as CPU utilization. A get(11111) operation is performed from all of the overlay nodes 110a-g. The global tree for the hashed attribute represented by the key 11111 then becomes all the other overlay nodes in the system, such as the overlay nodes 110a-g, and the overlay paths 111a-g between the overlay nodes 110a-g and the root node 110n. Overlay paths are paths in the overlay network. In one embodiment, the attribute is represented as a string of alphabets and that string is hashed to determine the key. The value may be a hash of the attribute descriptor, which for example is "CPU utilization".

After the global tree is formed, queries for the corresponding attribute are sent to the root node of the global tree. For example, the corresponding attribute for the global tree is CPU utilization. A query for CPU utilization is routed in the DHT overlay network to the root node 110n using the key 11111. The root node 110n aggregates CPU utilizations from all the nodes 110a-g in the global tree based on an aggregate function and sends a response to the query to the node initially sending the query.

SDIMS allows applications to choose an appropriate aggregation scheme by providing three functions: install, update, and probe. Install( ) installs an aggregation function for an attribute type and specifies the update strategy that the function will use; update( ) inserts or modifies a node's local value for an attribute; and probe( ) obtains an aggregate value for an attribute for a specified subtree level. Also, nodes in a global tree store data that is aggregated along the tree. For example, each node has local data stored as a set of {attributeType, attributeName, value} tuples, such as {configuration, numCPUs, 16}, {mcast membership, session foo, yes}, or {file stored, foo, myIPaddress}. Also, the SDIMS functions may be performed by the aggregation agent 112 at each node and shown in FIG. 1.

The aggregation abstraction in SDIMS is defined across a tree spanning all nodes in the system. Thus, aggregating data in a global tree in response to a query involves all the nodes in the global tree, which in turn may be all the overlay nodes in the system. However, in some instances, a query may not be relevant to all the nodes in the global tree. In these instances, sending the query to all the nodes in the global tree increases query response time and wastes bandwidth. According to an embodiment described below and not described in SDIMS, subtrees of global trees are created in the system along particular attributes, which may be attributes common to many queries.

According to an embodiment, subtrees are created in the system 100 which span all nodes with certain attributes. A subtree is a subset of a global tree. Subtrees may be created for attributes that are commonly queried. Thus, when a query is received at a root node having an attribute corresponding to a subtree of the root node, the query may only be disseminated to the subtree rather than to the entire global tree. This is described in further detail below.

As described above, subtrees are created in the system 100 which span all nodes with certain attributes. This may include nodes that satisfy a predicate condition. A predicate condition is a condition that each node can evaluate to determine if it satisfies the condition or not A predicate condition may include an attribute descriptor and a corresponding attribute value and a comparison operator. For example, a predicate condition is (OS=Linux). The attribute descriptor in this example is OS. The attribute value is Linux, and the comparison operator is equality "=". Thus, nodes hosting a Linux OS are included in the subtree. If the comparison operator is "!=", then nodes not hosting a Linux OS are included in the subtree. Another example of a predicate condition is (OS=Linux&server=Apache). In this example, a subtree is created along a predicate identifier denoting this predicate. The attribute descriptor contains two items: OS type and server type. The attribute values for the corresponding attributes are Linux and Apache. A predicate condition may include multiple attribute descriptors and values corresponding to multiple attributes. In yet another example, the attribute descriptor may be associated with the location of a node, such as the floor where a node is located or a cluster that the node is a member of. Then, an administrator can quickly get information about nodes on a particular floor or nodes in a particular cluster.

A subtree is created by disseminating the predicate condition to a global tree. The subtree stores an indication of whether each node satisfies the predicate condition, and uses "OR" function to determine which nodes in the global tree are members of the subtree.

Figure 3:
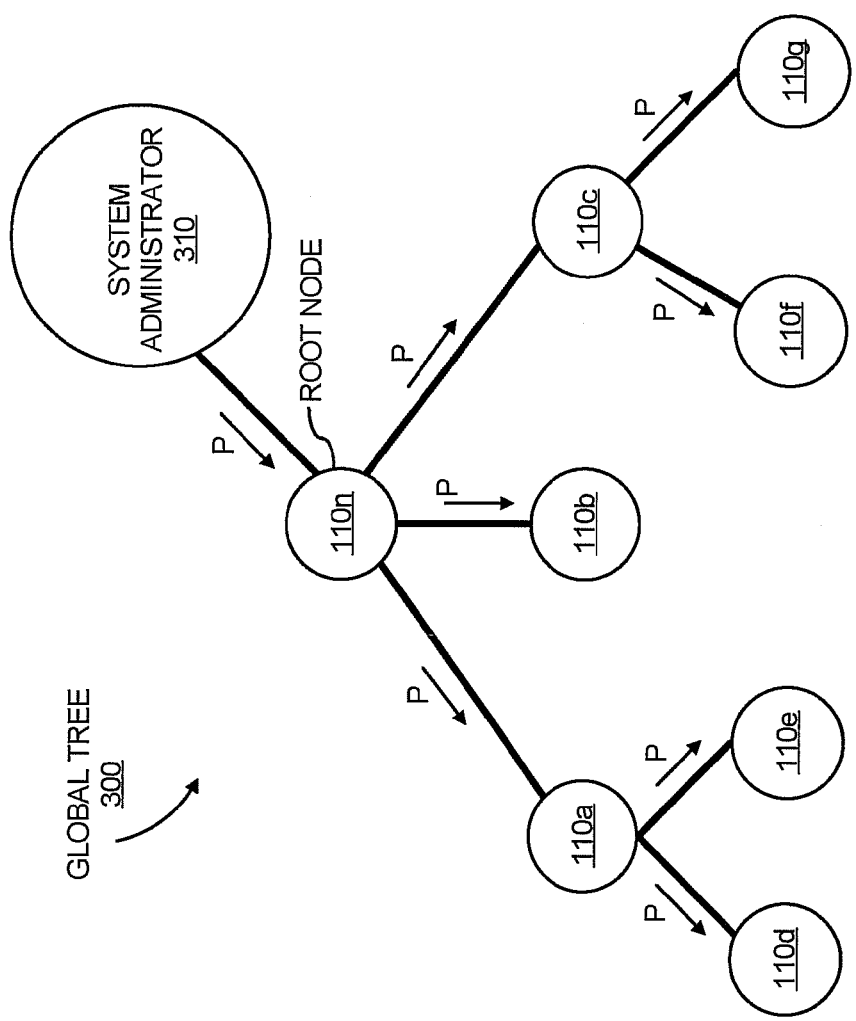
FIGS. 3 and 4 illustrate creating a subtree in a global tree, according to an embodiment.
Figure 4:
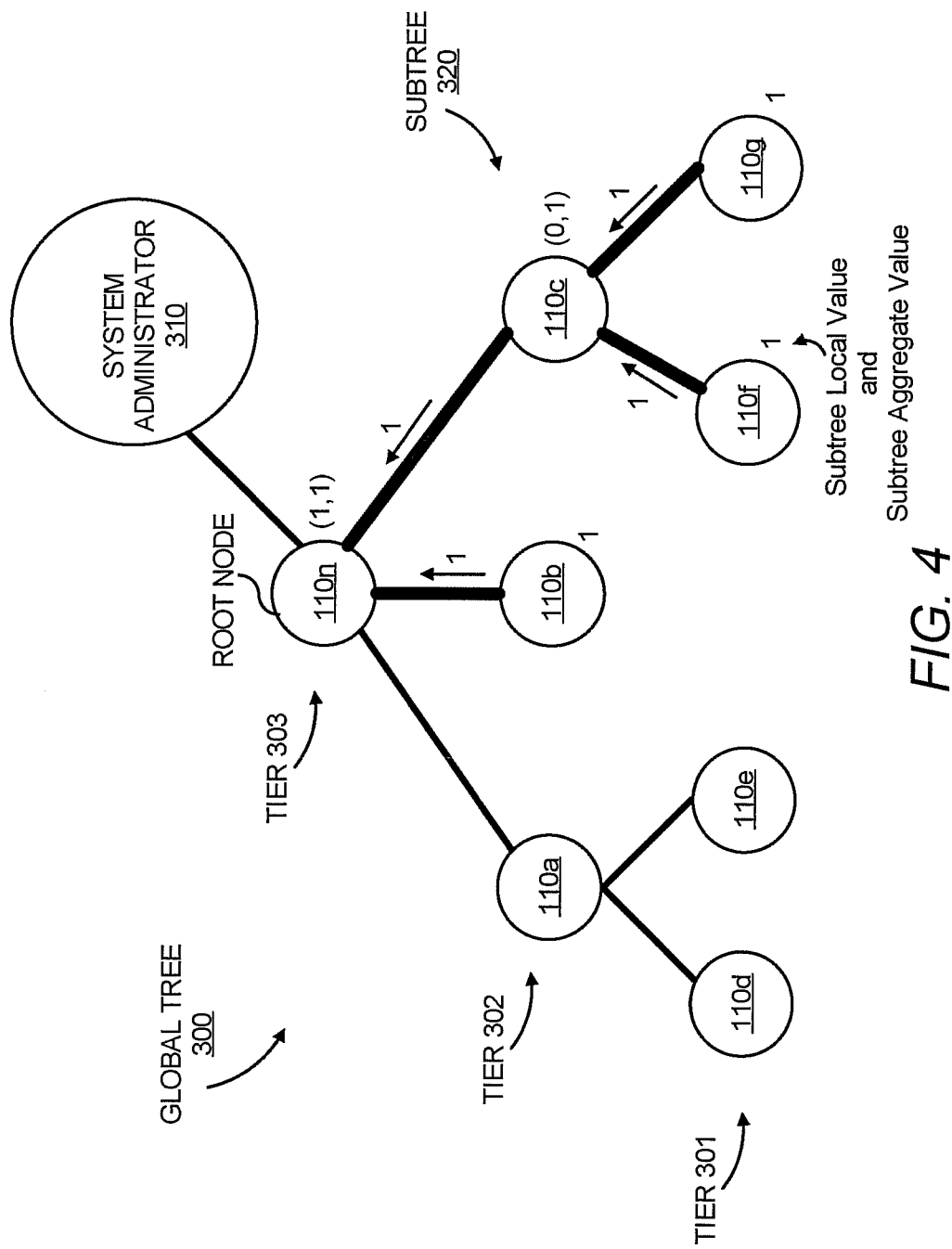

FIGS. 3 and 4 illustrate creating a subtree, according to an embodiment. For example, a predicate condition P is sent to a root node 110n in a global tree 300. In one example, P is sent by a system administrator 310. P is received at the root node 110n and disseminated to all the nodes, such as nodes 110a-g, in the global tree 300, as shown in FIG. 3. Along with P, the root node 110n may also disseminate an indication that the "OR" function will be used to OR the attribute described by the predicate condition in the global tree to create the subtree.

Each of the nodes 110a-g and 110n evaluates the predicate condition P to determine whether the node satisfies the predicate condition. For example if the predicate condition is (OS=Linux), then each of the nodes determines whether it includes a Linux OS. A subtree local value is set at each node to determine whether it satisfies the predicate condition. In one example, the subtree local value is a Boolean variable of 0 or 1. If the predicate condition is satisfied, a 1 is stored; otherwise a 0 is stored. The subtree value is stored along with a subtree descriptor at each node, so each node can quickly determine whether it belongs to a subtree described by the subtree descriptor. The subtree descriptor may include the predicate condition or another value identifying the subtree corresponding to the predicate condition.

FIG. 4 shows a subtree value comprised of a Boolean variable stored by each of the nodes 110a-g and 110n evaluating the predicate condition. The nodes 110n, 110b, 110f and 110g satisfy the predicate condition and thus have a subtree local value of 1. In addition to a subtree value, non-leaf nodes (i.e., parent nodes) also store a subtree aggregate value. For example, nodes 110c and 110n store subtree aggregate values which are determined as described below. Leaf nodes also store a subtree aggregate value, which is the same as the subtree local value.

The OR function is used to combine the subtree values for the predicate condition to form the subtree. For example, the predicate condition is sequentially aggregated starting from a lowest tier 301 in the global tree 300 to a highest tier 303. Each tier below the root node may include child nodes (children) of a parent node (parent) in a higher tier. Note that nodes in a higher tier may not have children in a lower tier. In this example, tier 301 includes nodes 110d, 110e, 110f, and 110g; tier 302 includes nodes 110a-c; and tier 303 includes the root node 110n.

An OR operation is performed at each node to compute a subtree aggregate value. For leaf nodes, the subtree aggregate value is simply their subtree local value. For other nodes with children, the subtree aggregate value is computed using an OR function applied across its children's subtree local values and its own subtree local value. For example, the node 110c has a subtree local value set to 0 because the node 110c does not satisfy the predicate condition, i.e., it does not have an Linux OS and thus does not satisfy the predicate condition. However, at the node 110c, the subtree value of the node 110c and the subtree aggregate values of the children 110f and 110g are input to an OR function to determine the subtree aggregate value of the node 110c. Because the children 110f or 110g have subtree values of 1, the subtree aggregate value of 110c is 1. A similar operation is performed for any nodes with children. Thus, children satisfying the predicate condition are not cut off from the subtree when a parent does not satisfy the predicate condition. Hence, a query including an attribute described in a predicate condition used to create a subtree is disseminated to all relevant nodes. Otherwise, for example, a query for Max or Avg CPU utilization for all Linux nodes may return an incorrect value if it did not reach the nodes 110f and 110g. The final subtree is shown as 320 including nodes 110n, 110b, 110c, 110f and 110g. The subtree 320 is shown with thicker connecting lines to distinguish from nodes not in the subtree 320. Also note that for nodes 110c and 110n the subtree values are shown as (subtree local value, subtree aggregate value). Also note that for the nodes 110f, 110g and 110b the subtree local value and the subtree aggregate value are the same, which is 1 in this case.

Thus, the subtree aggregate value identifies which nodes belong to the subtree and which nodes do not belong to the subtree. For example, a subtree aggregate value set to a logical 0 might indicate that the node does not satisfy the predicate condition, and a subtree aggregate value equal to a logical 1 might indicate that the node satisfies the predicate condition and belong to the subtree. A logical 0 is shown for the subtree local and aggregate values for the nodes 110a, 110d and 110e.

The subtree aggregate values for each of the nodes in the subtree may be reported to and stored at the root node along with a subtree descriptor. In another embodiment, the root node may only store an indication of the children of the root that are members of a particular subtree, so a query corresponding to the subtree is only distributed to those children. In this embodiment, each parent node stores the aggregate value for the subtree for its children nodes so the parent node can determine which child or children to send a query. Also, an indication that a particular subtree is created, which may include a subtree descriptor and indication of the root node for the subtree, may be disseminated to all the nodes in the system 100.

Subtree maintenance is also performed by nodes. For example, whenever a node does not satisfy the predicate condition for a subtree any more, it sets its local value to 0 and determines the aggregate value again and forwards it to the parent node. Also, a node may become part of a subtree if its attribute change such that the predicate condition is satisfied.

Once a subset tree is established, a query resolution mechanism is used to ensure that queries for nodes that satisfy a predicate are disseminated to the subtree created for that predicate. This mechanism allows the query to only traverse the subtree to avoid the extra overhead cost of sending the query to the whole system.

Figure 5:
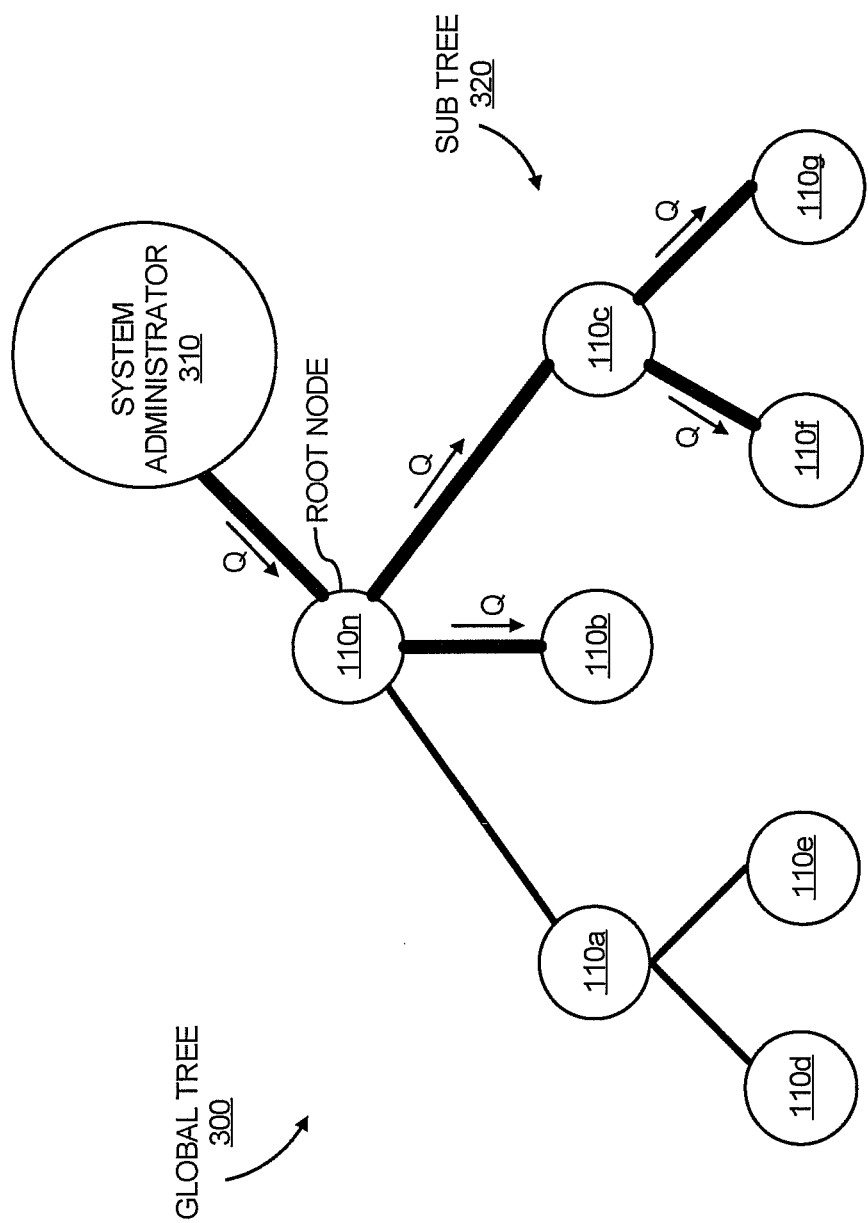
FIGS. 5 and 6 illustrate query resolution in a subtree, according to an embodiment.

FIG. 5 illustrates receiving a query Q from the system administrator 310 at the root node 110n and disseminating the query Q to the subtree 320. The query Q may be in the form of a query probe. A query probe is a message including a query aggregation function and a query predicate condition. Examples of an aggregate function may include minimum (Min), maximum (Max), average (Avg), concatenate (Concat), sum, etc. Included with the aggregate function is an attribute to be aggregated in the system 100. For example, CPU utilization is the attribute to be aggregated, so the query P may include Max CPU utilization. In this example, CPU utilization is used to route the query to the root node 110n, which is responsible for the global tree for CPU utilization, using the SDIMS mechanism described above.

The query probe may include a query predicate condition identifying a corresponding subtree. For example, the query predicate condition includes a query descriptor (e.g., OS), query comparison operator (e.g., equality) and a corresponding query predicate value (e.g., Linux). The query predicate condition may correspond to a predicate condition used to create a subtree, so the relevant subtree can be easily identified. If subtree identifiers other than a predicate condition are used, the query predicate may include a subtree identifier so the root node can quickly determine which subtree, if any, is relevant to the query. The root node 110n may compare information in the query predicate condition, such as the predicate condition or subtree identifier, to stored subtree information to identify any relevant subtrees to the query. As shown in FIG. 5, the query Q, is disseminated to the subtree 320, which is determined to be relevant to the query Q.

Assume the query Q is for Max CPU utilization for nodes having a Linux OS. Each of the nodes in the subtree 320 that satisfies the query predicate condition sequentially responds to the query Q starting from the lowest tier. Also, the aggregation function is performed at each node in the subtree 320 having children. This is illustrated in FIG. 6.

Figure 6:
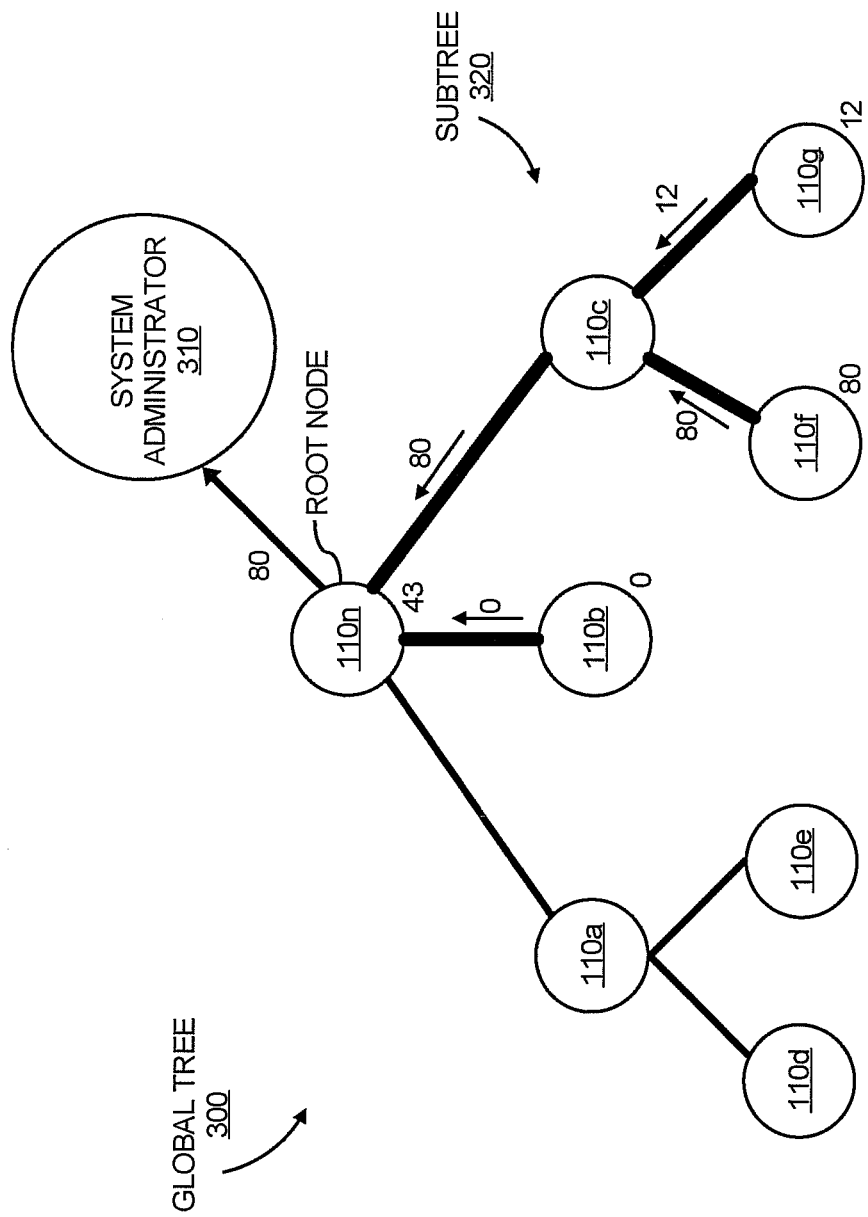

FIG. 6 shows each node in the subtree 320 resolving the query Q. Nodes 110f and 110g determine their Max CPU utilization is 80 and 12 respectively, which may be in terms of some unit of CPU utilization measurement. Max CPU utilization may be determined by one of the tools connected to the aggregation agent 112 shown in FIG. 1. The aggregation agent 112 may perform the functions described with respect to creating subtrees and resolving queries.

The nodes 110f and 110g send their Max CPU utilizations up the subtree to their parent, which is the node 110c. The node 110c also performs the aggregation function by aggregating the Max CPU utilization. Since node 110c does not satisfy the predicate, it does not include its local value in the aggregation. So it performs the aggregation for only the children's values. For example, the node 110c determines the Max of 80 and 12 and sends the Max to its parent, which is the node 110n. The node 110n resolves the query Q by determining the Max CPU utilization of the subtree 320, which is 80. The Max CPU utilization for all nodes having a Linux OS is then transmitted to the node making the query, which is the system administrator 310 in this example.

It should be noted that information is exchanged between nodes as needed to identify a subtree and to perform an aggregate function. For example, a node may receive a query from a parent or a query resolution from a child including information identifying the subtree. The node uses this information to determine whether it is in the same subtree identified in the received information and responds accordingly. Also, information is exchanged to perform the aggregate function, such as attribute information from children needed to perform a Max or Min function. For Concat, a list of all the attributes is forwarded. For AVG, the number of values as well as the sum of values from each node are exchanged so parent nodes can calculate the average.

Figure 7:
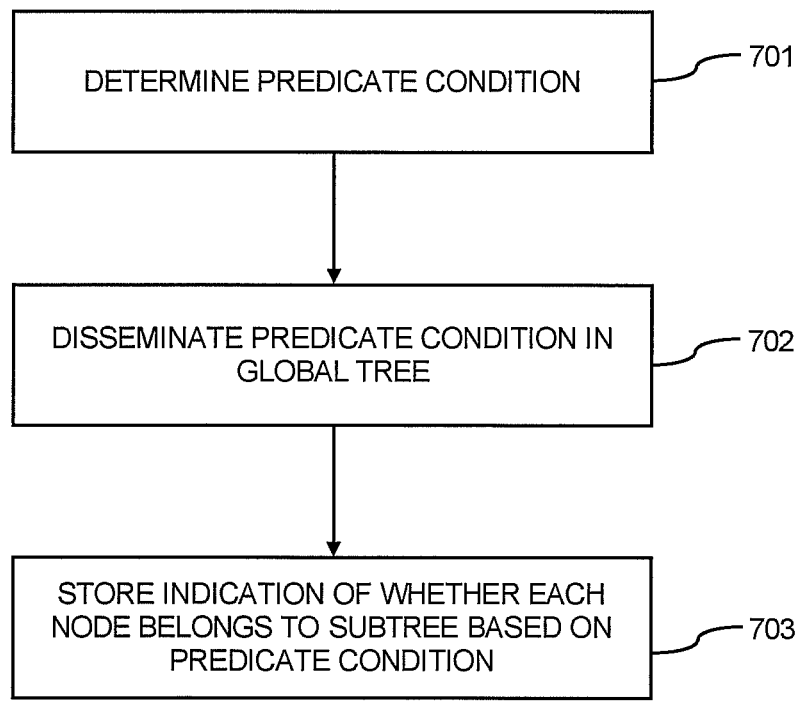
FIG. 7 illustrates a flow chart of a method for creating a subtree, according to an embodiment.

FIG. 7 illustrates a method 700 for creating a subtree, according to an embodiment. The method 700 is described with respect to one or more of FIGS. 1-6 by way of example and not limitation.

At step 701, a predicate condition is determined. This may include receiving a predicate condition or determining the predicate condition based on attributes commonly found in many queries. The predicate condition P is received at the root node 110n shown in FIG. 3.

At step 702, the predicate condition is disseminated in a global tree, such as shown in FIG. 3.

At step 703, for each node in the global tree, an indication is stored of whether the node belongs to the subtree based at least on the predicate condition. For example, as shown in FIG. 4, each of the nodes determines whether it satisfies the predicate condition and sets a subtree local value, for example, to 1 if the node satisfies the subtree value. AN OR function is used to combine subtree local values at all parent nodes to determine a subtree aggregate value for the parent nodes. For leaf nodes, the subtree local value is equal to the subtree aggregate value.

Figure 8:
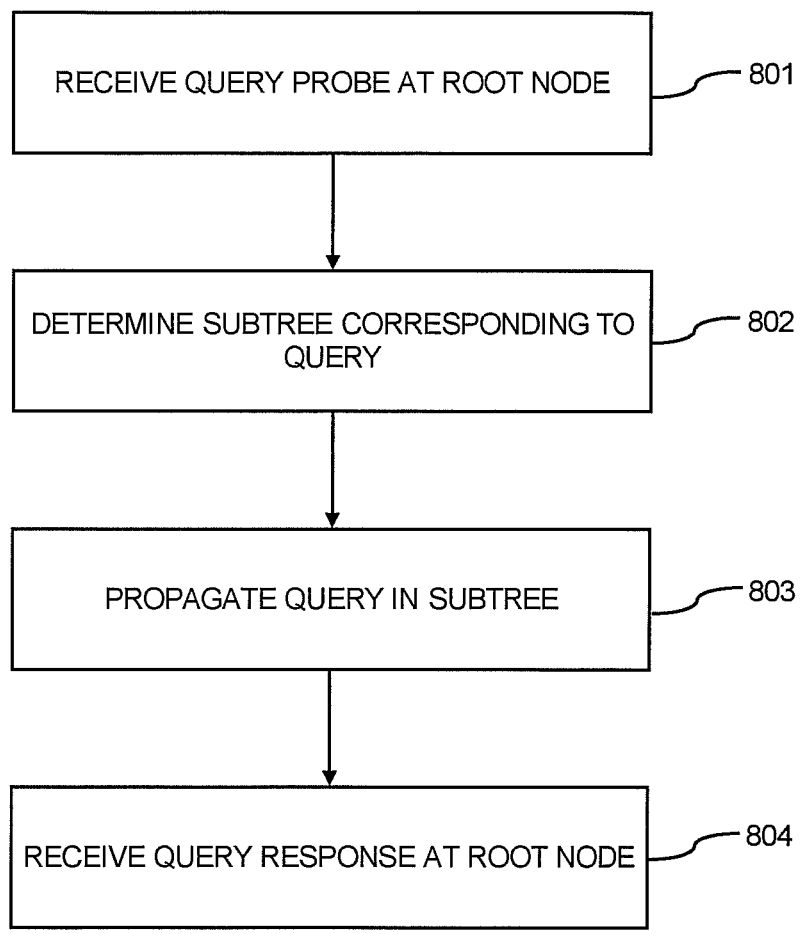
FIG. 8 illustrates a flow chart of a method for resolving a query, according to an embodiment.

FIG. 8 illustrates a method 800 for resolving a query, according to an embodiment. The method 800 is described with respect to one or more of FIGS. 1-6 by way of example and not limitation.

At step 801, a query probe is received at the root node of a global tree. The query probe includes a query aggregation function and a query predicate condition. FIG. 5 shows the query Q received at the root node 110n.

At step 802, a subtree in the global tree corresponding to the query predicate condition is determined. For example, the root node stores a subtree identifier. In one example, the subtree identifier includes a predicate condition used to create the subtree. If that predicate condition matches the query predicate condition, then the subtree in the global tree corresponding to the query is identified.

At step 803, the query probe is propagated from the root node only to nodes in the subtree, such as shown in FIG. 5.

At step 804, a response is determined from a resolution of the query probe performed at each node in the subtree, and the response is received at the root node, such as shown in FIG. 6. The aggregate function may include an aggregate function and an attribute to be aggregated. Each node in the subtree determines the value for the query attribute only if it satisfies the query predicate, and parent nodes aggregate the attribute values. The aggregated attribute value is propagated up the subtree as described with respect to FIG. 6.

Figure 9:
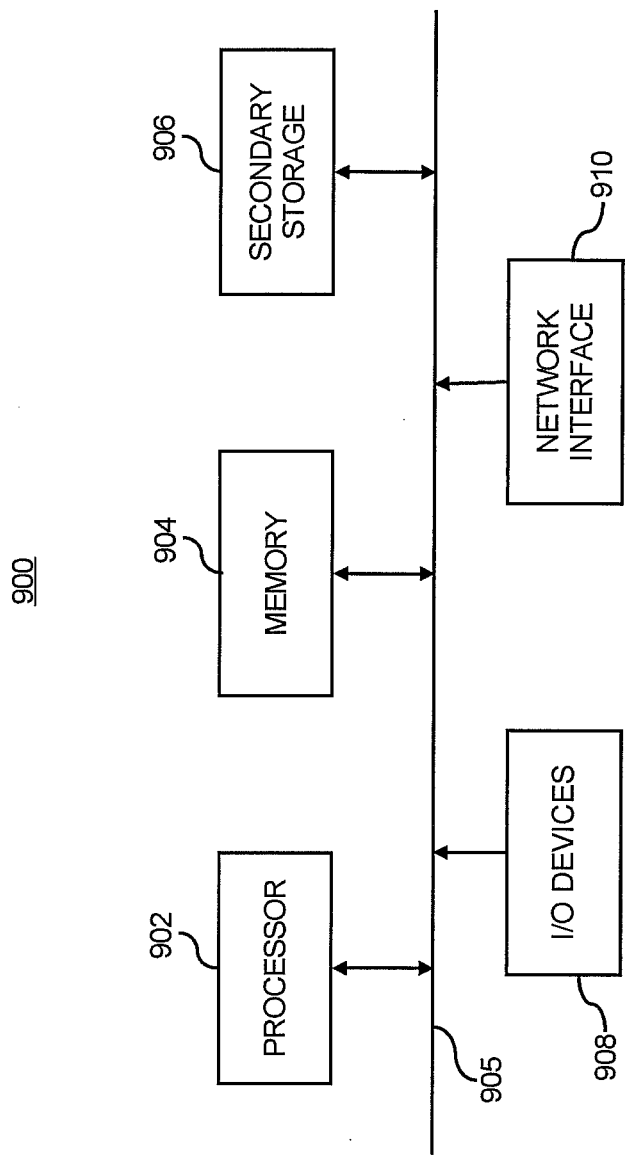
FIG. 9 illustrates a block diagram of a computer system, according to an embodiment.

FIG. 9 illustrates an exemplary block diagram of a computer system 900. The computer system 900 may be used as a platform for a node shown in FIG. 1, which may be a node in a global tree or subtree.

The computer system 900 includes one or more processors, such as processor 902, providing an execution platform for executing software. Commands and data from the processor 902 are communicated over a communication bus 905. The computer system 900 also includes a main memory 904, such as a Random Access Memory (RAM), where software may be resident during runtime, and a secondary storage 906. The secondary storage 906 includes, for example, a hard disk drive and/or a removable storage drive, representing a floppy diskette drive, a magnetic tape drive, a compact disk drive, etc., or a nonvolatile memory where a copy of the software may be stored. The secondary storage 909 may also include ROM (read only memory), EPROM (erasable, programmable ROM), EEPROM (electrically erasable, programmable ROM). In addition to storing software, the data storage 904 or 906 may be used to store information for creating subtrees, resolving queries in the subtrees, date center level metrics and any other information that may be relevant to creating trees and resolving queries in an in-network aggregation system.

A user interfaces with the computer system 900 with one or more I/O devices 908, such as a keyboard, a mouse, a stylus, display, and the like. A network interface 910 is provided for communicating with other computer systems via a network, which may include other nodes in the system 100.

One or more of the steps of the methods 700 and 800 and other steps described herein may be implemented as software embedded on a computer readable medium, such as the memory 904 and/or data storage 906, and executed on the computer system 900, for example, by the processor 902. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

FIG. 1 illustrates the tree-construction agent 111 and the aggregation agent 112. These agents may include software stored in the memory 904 and/or data storage 906 and executed by the processor 902.

The aggregation agent 112 may include modules comprised of software instructions operable to control the processor 902, at least in cooperation with agents at other nodes in the network, to create a subtree within a global tree. Another module is operable to control the processor 902, in cooperation with agents at other nodes in the network, to resolve a query put to the subtree in order to obtain a query resolution.

Figure 10:
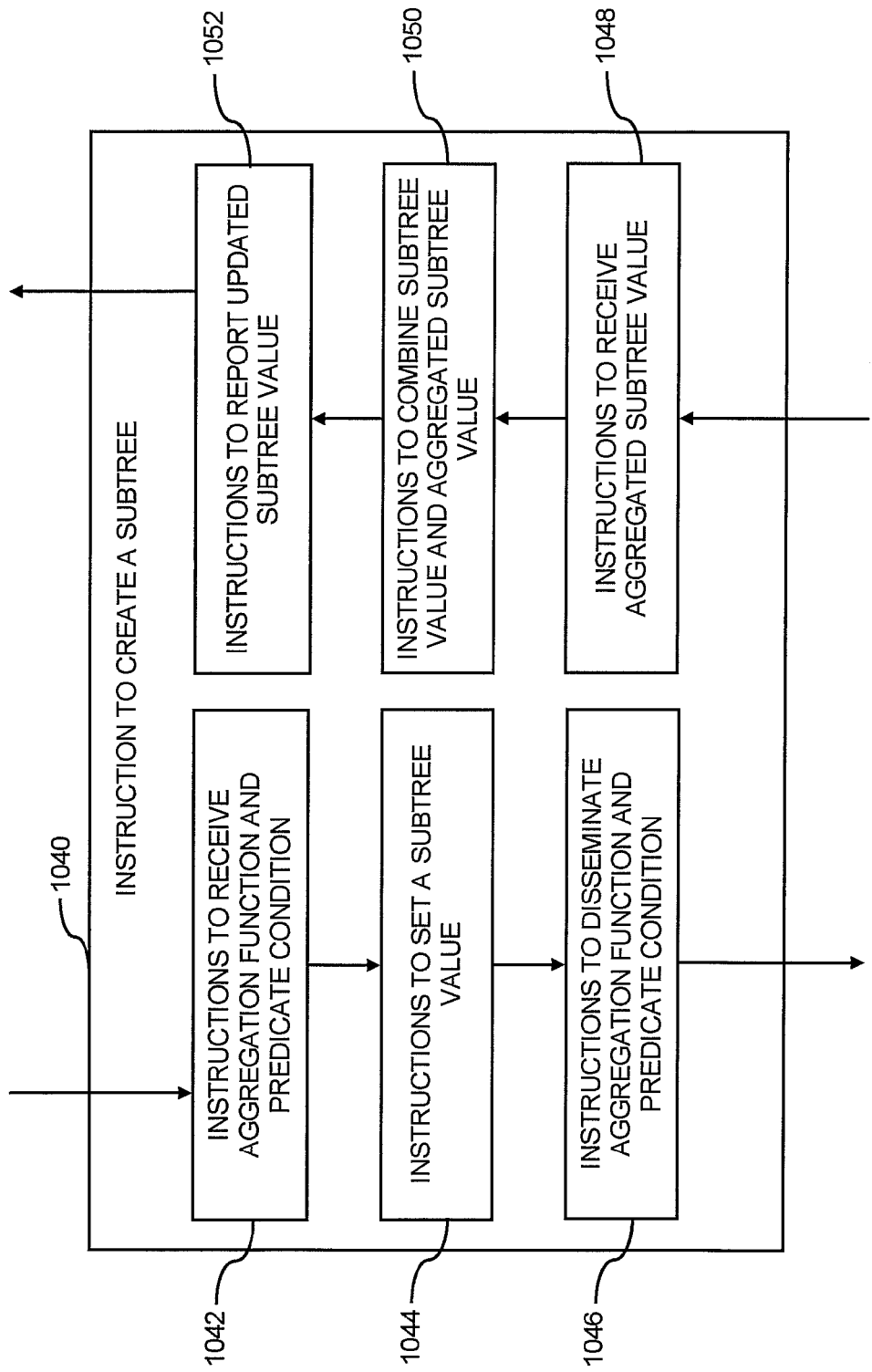
FIGS. 10 and 11 illustrate software modules, according to embodiments.
Figure 11:
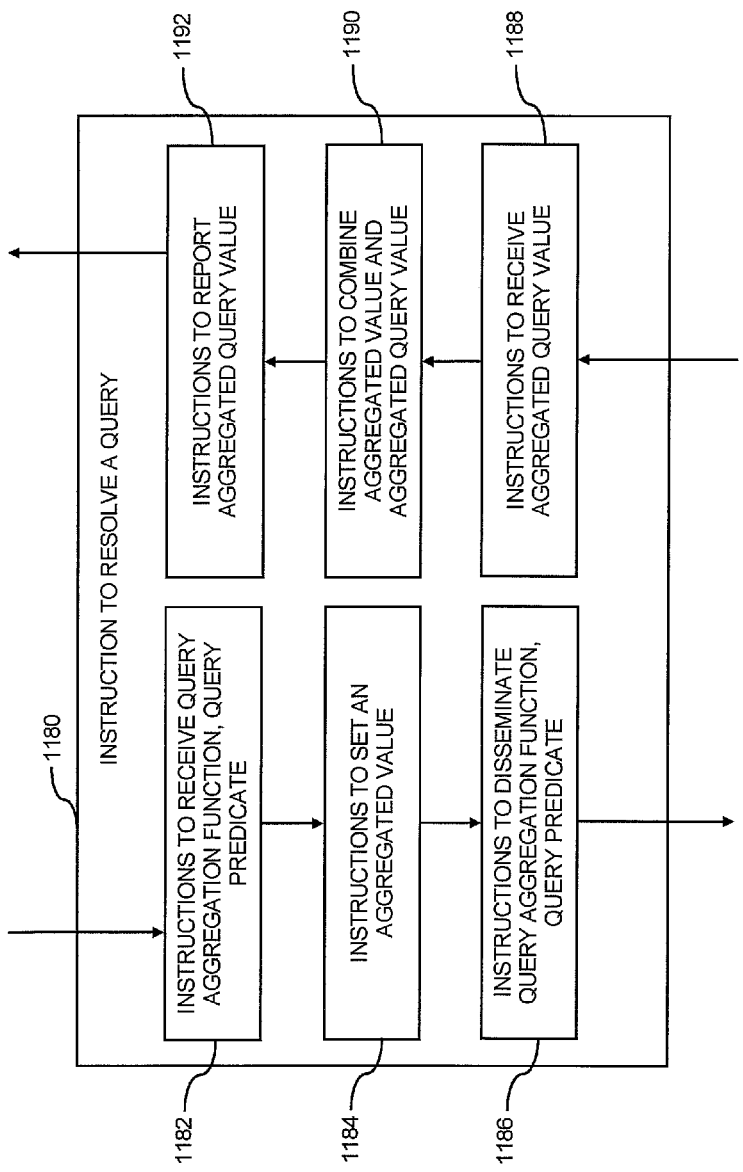
Figure 12:
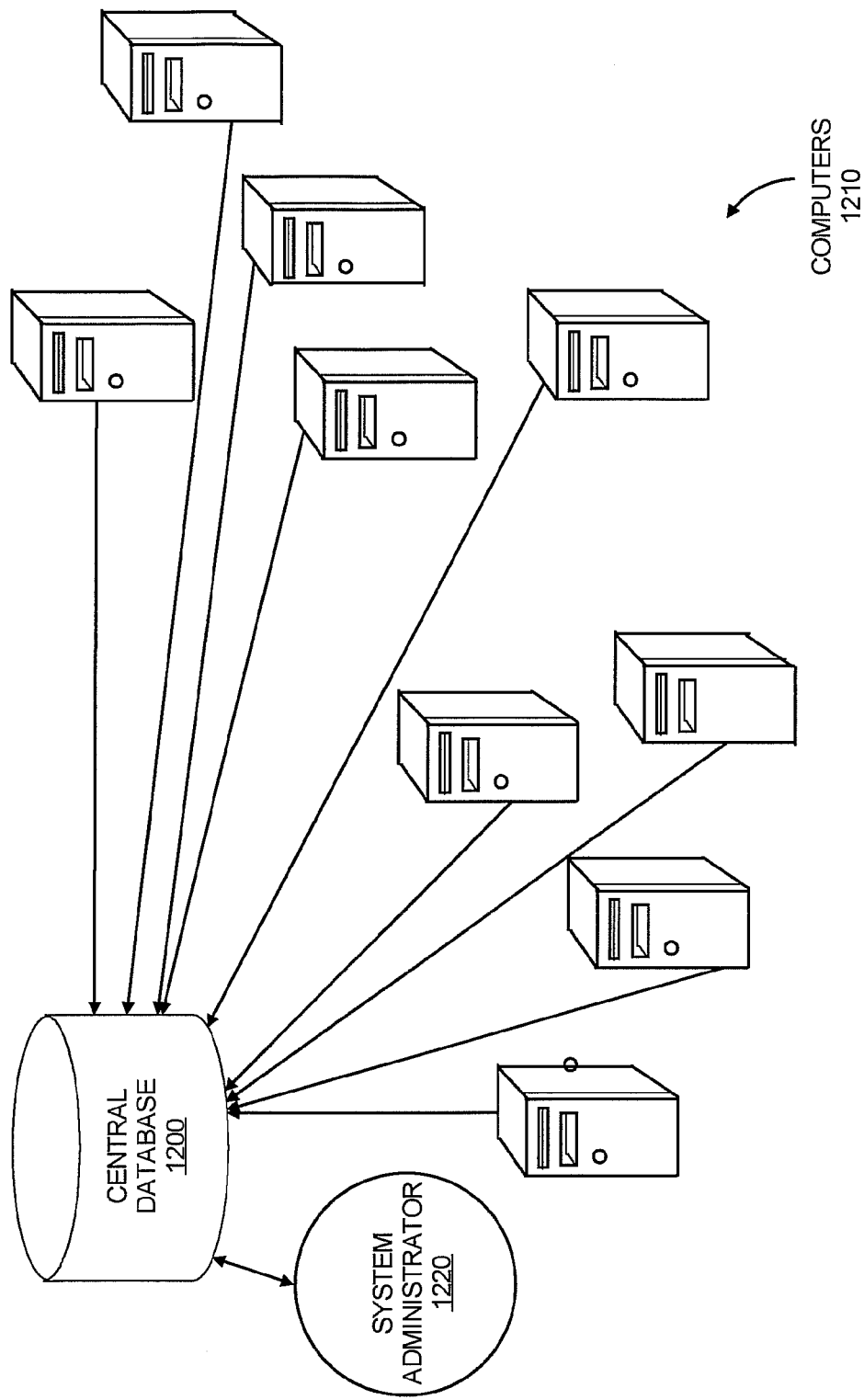
FIG. 12 illustrates a centralized system for collecting and storing metrics, according to the prior art.

FIGS. 10 and 11 illustrate modules that may be included in the aggregation agent 112. FIG. 10 illustrates a first module 1040 including instruction sets 1042, 1044 and 1046 for creating a subtree. The set of instructions 1042 is operable to control a processor to receive an aggregation function and a predicate condition from an agent in a higher tier of a global tree. The predicate condition for example specifies an attribute descriptor and a corresponding attribute value and an operator. The set of instructions 1044 is operable to control the processor to set a subtree local value that corresponds to a subtree descriptor according to whether the node satisfies the predicate condition. The set of instructions 1046 is operable to control the processor to disseminate the aggregation function, which is an OR, and the predicate condition to an agent at each node in a lower tier in the global tree and directly linked to the node (children).

FIG. 10 also illustrates instruction sets 1048, 1050 and 1052. The instruction set 1048 is operable to control the processor to receive a subtree local value from a child. The instruction set 1050 is operable to control the processor to combine, according to the aggregation function, the subtree local value for the node and the children to determine a subtree aggregate value for the node. The instruction set 1052 is operable to control the processor to report the subtree aggregate value to a node agent in a higher tier (parent).

FIG. 11 illustrates a second module 1180 for resolving a query in a subtree and includes instruction sets 1182, 1184 and 1186. The set of instructions 1182 is operable to control a processor to receive a query aggregation function and a query predicate condition. The query predicate condition includes a predicate descriptor, a comparison operator and a corresponding query predicate value that is used to determine whether a node belongs to a subtree. The set of instructions 1184 is operable to control the processor to set an aggregated value corresponding to an aggregation descriptor. The aggregated value is set according to the query aggregation function and characteristics of the node. The set of instructions 1186 is operable to control the processor to disseminate the query aggregation function, the aggregation descriptor and the query predicate condition to an agent at each node that is directly linked to the node in the global tree and also satisfies the query predicate condition.

The second module 1180 further includes instruction sets 1188, 1190 and 1192. The set of instructions 1188 is operable to control the processor to receive an aggregated query value from the agent at a child node. The set of instructions 1190 is operable to control the processor to combine, according to the query aggregation function, the aggregated value at the node with the aggregated query value received from the agent at each child node. The combined result is the aggregated query value of the first node. The set of instructions 1192 operable to control the processor to report the aggregated query value for the node to a higher tier agent.

While the embodiments have been described with reference to examples, those skilled in the art will be able to make various modifications to the described embodiments without departing from the scope of the claimed embodiments.

What is claimed is:

1. A method of creating a subtree within a global tree including a plurality of nodes and disseminating a query, wherein the subtree is a subset of the global tree, the method comprising:

determining a predicate condition for the subtree;

disseminating the predicate condition to each of the plurality of nodes in the global tree, wherein each node in the global tree receives the disseminated predicate condition and evaluates itself to determine whether it satisfies the predicate condition, and the nodes in the global tree that satisfy the predicate condition belong to the subtree;

for each of the plurality of nodes in the global tree, storing a subtree local value, wherein the subtree local value of a node in the global tree is an indication of whether the node in the global tree belongs to the subtree based at least on the predicate condition;

for each parent node in the global tree, storing a subtree aggregate value, wherein the subtree aggregate value is determined from the subtree local value of the parent node and a subtree local value of each child node of the parent node;

receiving a query for the subtree; and disseminating the query to only the nodes belonging to the subtree rather than to all of the nodes in the global tree.

2. The method of claim 1, wherein the subtree aggregate value at each parent node in the global tree is determined by using an OR function to combine the subtree local value of the parent node and the subtree local value of each child node of the parent node.

3. The method of claim 1, further comprising:

sequentially determining the subtree aggregate value at each node of the global tree from nodes at a lowest tier in the global tree to a root node at a root tier in the global tree.

4. The method of claim 3, wherein determining the subtree aggregate value at each node comprises:

determining whether the node satisfies the predicate condition; and storing a subtree local value indicating whether the node satisfies the predicate condition.

5. The method of claim 4, wherein determining the subtree aggregate value at each node comprises:

for each leaf node, determining the subtree aggregate value is its subtree local value;

for each parent node, determining the subtree aggregate value by using an OR function to combine subtree aggregate values from any children nodes to the parent node and the subtree local value at the parent node.

6. The method of claim 5, wherein the children nodes comprise any nodes in a lower tier in the global tree and directly connected to the parent node.

7. The method of claim 1, wherein nodes in the subtree comprise nodes in a data center storing data center level metrics and the nodes are to respond to queries including attributes corresponding to the predicate condition.

8. The method of claim 1, wherein the plurality of nodes are nodes in an in-network data aggregation system, where data is aggregated along the global tree or the subtree and stored in a root node.

9. The method of claim 1, wherein the predicate condition comprises an attribute descriptor and a corresponding attribute value and a comparison operator.

10. A method of resolving a query submitted to a root node of a global tree including a plurality of nodes in an in-network data aggregation system, the method comprising:

receiving a query probe at the root node, the query probe comprising a query aggregation function and a query predicate condition;

determining a subtree in the global tree corresponding to the query predicate condition;

propagating the query probe from the root node only to nodes in the subtree, wherein the subtree includes a subset of a plurality of nodes in the global tree; and receiving a response determined from a resolution of the query probe performed at each node in the subtree, wherein determining the subtree in the global tree comprises, determining a predicate condition for the subtree;

disseminating the predicate condition to each of the plurality of nodes in the global tree;

each of the plurality of nodes in the global tree receiving the disseminated predicate condition and evaluating itself to determine whether it satisfies the predicate condition, and the nodes in the global tree that satisfy the predicate condition belong to the subtree;

each of the plurality of nodes in the global tree storing a subtree local value, wherein the subtree local value is an indication of whether the node in the global tree belongs to the subtree based at least on the predicate condition; and each parent node in the global tree storing a subtree aggregate value, wherein the subtree aggregate value is determined from the subtree local value of the parent node and a subtree local value of each child node of the parent node.

11. The method of claim 10, further comprising:

sequentially aggregating the resolutions from all nodes in the subtree from a lowest tier of the subtree to the root node at a root tier of the subtree to form the response.

12. The method of claim 11, wherein sequentially aggregating the resolutions from all nodes in the subtree comprises:

at each parent node in the subtree, receiving the resolutions from any children nodes to the parent node and aggregating the received resolutions and the resolution of the parent node using the aggregate function in the query probe; and sending the aggregated resolutions to a higher tier in the subtree if a highest tier has not been reached.

13. The method of claim 10, wherein the query predicate condition comprises a query descriptor, a comparison operator, and a corresponding query predicate value, and determining a subtree in the global tree corresponding to the query predicate condition further comprises:

using the query descriptor to determine the subtree in the global tree corresponding to the query predicate condition.

14. The method of claim 10, wherein propagating the query probe further comprises:

disseminating the query probe using the query predicate condition to identify nodes in the subtree that are children to a parent node in the subtree.

15. The method of claim 10, wherein the query aggregation function comprises an aggregate function and attribute that is aggregated using the aggregate function.

16. The method of claim 10, wherein the global tree comprises nodes in the in-network data aggregation system storing data center level metrics and the query probe includes a query for at least one of the data center metrics.

17. In a network of a plurality of nodes ordered into a global tree in an in-network aggregation system, an agent to be deployed at a first node in the global tree, the agent comprising instructions stored on a non-transitory computer readable storage device to be executed by a processor, the instructions comprising:

a first module of instructions to be executed by the processor, in cooperation with agents at other nodes in the network, to create a subtree within the global tree, wherein the subtree is a subset of the global tree, by determining a predicate condition for the subtree, the predicate condition including an attribute descriptor and a corresponding attribute value and a comparison operator;

disseminating the predicate condition to each of the plurality of nodes in the global tree;

each of the plurality of nodes in the global tree receiving the disseminated predicate condition and evaluates itself to determine whether it satisfies the predicate condition, wherein the nodes in the global tree that satisfy the predicate condition belong to the subtree;

for each of the plurality of nodes in the global tree, storing a subtree local value, wherein the subtree local value is an indication of whether the node belongs to the subtree based on the predicate condition;

for each parent node in the global tree, storing a subtree aggregate value, wherein the subtree aggregate value is determined from the subtree local value of the parent node and a subtree local value of each child node of the parent node; and a second module of instructions to be executed by the processor, in cooperation with agents at other nodes in the network, to resolve a query put to the subtree in order to obtain a response to the query.

18. The agent of claim 17, wherein the first module comprises instruction for determining whether the nodes in the global tree belong to the subtree by determining whether the nodes satisfy the predicate condition; and for parent nodes, aggregating values associated with the predicate condition from the parent node and any children nodes to the parent node using an OR function.

19. The agent of claim 17, wherein the second module of instructions comprises instructions for:

receiving the query, the query comprising a query aggregation function and a query predicate condition;

propagating the query from a root node only to nodes in the subtree; and receiving a response determined from a resolution of the query performed at each node in the subtree.

20. The agent of claim 19, wherein the response is determined by each node in the subtree starting from nodes in a lowest tier of the subtree, by receiving resolutions from any children nodes and aggregating any received resolutions and the resolution of a current node using the aggregate function in the query; and sending the aggregated resolutions to a higher tier in the subtree if a highest tier has not been reached.

* * * * *